(12) United States Patent
Silverstein

(10) Patent No.: US 8,675,091 B2
(45) Date of Patent: Mar. 18, 2014

(54) IMAGE DATA PROCESSING WITH MULTIPLE CAMERAS

(75) Inventor: Amnon Silverstein, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 817 days.

(21) Appl. No.: 12/334,895

(22) Filed: Dec. 15, 2008

(65) Prior Publication Data

US 2010/0149372 A1 Jun. 17, 2010

(51) Int. Cl.
*H04N 9/73* (2006.01)
*G06K 9/00* (2006.01)

(52) U.S. Cl.
USPC ............... 348/223.1; 382/167; 348/208.99

(58) Field of Classification Search
USPC ............... 348/223.1, 208.99, 47, 153, 224.1, 348/227.1, 229.1, 222.1, 211.11
See application file for complete search history.

(56) References Cited

U.S. PATENT DOCUMENTS

| 3,904,818 | A | | 9/1975 | Kovac | |
|---|---|---|---|---|---|
| 4,253,120 | A | | 2/1981 | Levine | |
| 6,724,423 | B1 | * | 4/2004 | Sudo | 348/223.1 |
| 7,626,612 | B2 | * | 12/2009 | John et al. | 348/208.4 |
| 7,817,187 | B2 | * | 10/2010 | Silsby et al. | 348/208.99 |
| 7,859,568 | B2 | * | 12/2010 | Shimano et al. | 348/208.6 |
| 7,860,382 | B2 | * | 12/2010 | Grip | 396/51 |
| 2003/0218672 | A1 | * | 11/2003 | Zhang et al. | 348/14.16 |
| 2005/0175257 | A1 | * | 8/2005 | Kuroki | 382/278 |
| 2006/0119710 | A1 | * | 6/2006 | Ben-Ezra et al. | 348/208.99 |
| 2008/0231726 | A1 | * | 9/2008 | John | 348/223.1 |
| 2009/0002517 | A1 | * | 1/2009 | Yokomitsu et al. | 348/223.1 |

* cited by examiner

*Primary Examiner* — Aung S Moe

(57) ABSTRACT

Pictures can be taken with multiple (e.g., two) cameras, and the statistics associated with any of those pictures can be used to correct (e.g., color balance) any of the other pictures. Generally speaking, first image data captured by a first camera is accessed (e.g., retrieved from memory). Similarly, second image data captured by a second camera is accessed. The first image data and second image data are acquired at or about the same time using the first and second cameras together (e.g., at the same location, so that each camera is subject to the same light source). The first image data can then be processed (e.g., color balanced) using information that is derived using the second image data.

16 Claims, 3 Drawing Sheets

IMAGE DATA PROCESSING WITH MULTIPLE CAMERAS

FIELD

Embodiments according to the present invention generally relate to digital cameras.

BACKGROUND

The human visual system perceives surface colors consistently under a wide variety of scene illuminations. For example, to the human visual system, a white piece of paper remains resolutely white independent of the color of the illuminant (light source) under which the piece of paper is viewed. This phenomenon is known as "color constancy."

In contrast, color imaging systems (e.g., digital cameras) are not naturally adaptive like the human visual system. Accordingly, a digital camera cannot acceptably reproduce a scene's actual colors without compensating for the influence of the color (color temperature) of the light source. For example, without accounting for the color of the light source, a picture taken under tungsten light will look yellowish, and a picture taken under florescent light will look bluish. Thus, the color of the light source must be determined so that the image data can be "corrected" to compensate for the effect of the light source. This process is commonly referred to as "color balancing" or "white balancing."

In color/white balancing, the color of the scene illumination is either measured or estimated from the image data, and then the image data is adjusted to compensate. In some implementations, the camera is equipped with the functionality and processing capability needed to estimate the color of the light source from the image data. For example, a camera may be equipped with a light meter that can be used to identify the color of the light source. A camera may instead rely on a statistics-based computational approach in which all of the pixel color values in an image are averaged, and the image data is then adjusted so that the average of the pixel color values is gray. Alternatively, a photographer may calibrate the camera to a known reference color (e.g., a gray card) every time pictures are taken.

Conventional white balancing techniques can be problematic for a variety of reasons. For example, it may be impractical or too costly to equip each camera with a dedicated light meter. Use of a gray card may be impractical and inconvenient because the photographer has to carry and set up such a card and spend extra time taking a picture. Statistics-based techniques may be inaccurate in many scenarios because, for example, the average color of a scene may not actually be gray.

SUMMARY

According to embodiments of the present invention, pictures are taken with multiple cameras, and the statistics associated with those pictures are used, for example, for color balancing.

Generally speaking, in one embodiment, first image data captured by a first camera is accessed (e.g., retrieved from memory). Similarly, second image data captured by a second camera is accessed. In one such embodiment, the first image data and second image data are acquired at or about the same time using the first and second cameras together (e.g., at the same location, so that each camera is subject to the same light source). The first image data is then processed using information that is derived from the second image data. The second image data may be used by itself or in combination with the first image data.

Embodiments in accordance with the invention are particularly useful in devices, such as cell phones, that have two built-in cameras: a first camera that faces toward the scene to be captured in a first picture; and a second camera that faces in a different direction, and that in one embodiment faces the user/photographer. In the latter embodiment, the second camera is used to take a second picture of the photographer at the same time the first camera is used to take the first picture. As such, the photographer's skin tone, for example, can be used as a reference point for color balancing. In effect, the photographer's skin tone is used in manner analogous to that of a gray card.

More generally, in one embodiment, a known surface in a second picture can be used to estimate the color of the light source. Based on that estimate, color correction factors can be derived. The color correction factors derived from the second picture can then be applied to color balance a first picture.

Embodiments in accordance with the present invention are not limited to those described above. For example, in one embodiment, the second image data can be used to implement image stabilization in the first camera. In another embodiment, the second image data can be used to adjust a setting (e.g., gain, exposure, etc.) of the first camera. In yet another embodiment, metadata associated with the second image data can be used to categorize the first image data. For example, the image of the photographer (captured by the second camera) can be saved with each picture taken by that photographer with the first camera.

In summary, by using two or more cameras in the manner described above, processes such as color balancing and image stabilization can be conveniently and inexpensively implemented while maintaining if not improving picture quality.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
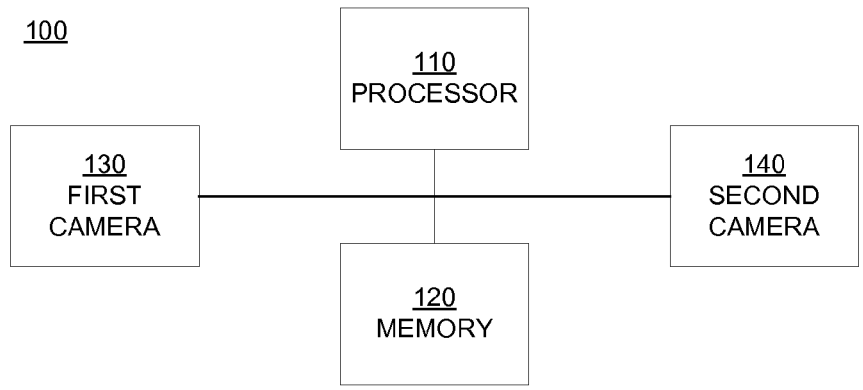
FIG. 1 is a block diagram of an example of a system upon which embodiments according to the invention can be implemented.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "processing," "deriving," "identifying," "applying," "implementing," "color balancing," "stabilizing," "adjusting," "calibrating," "sorting," "categorizing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
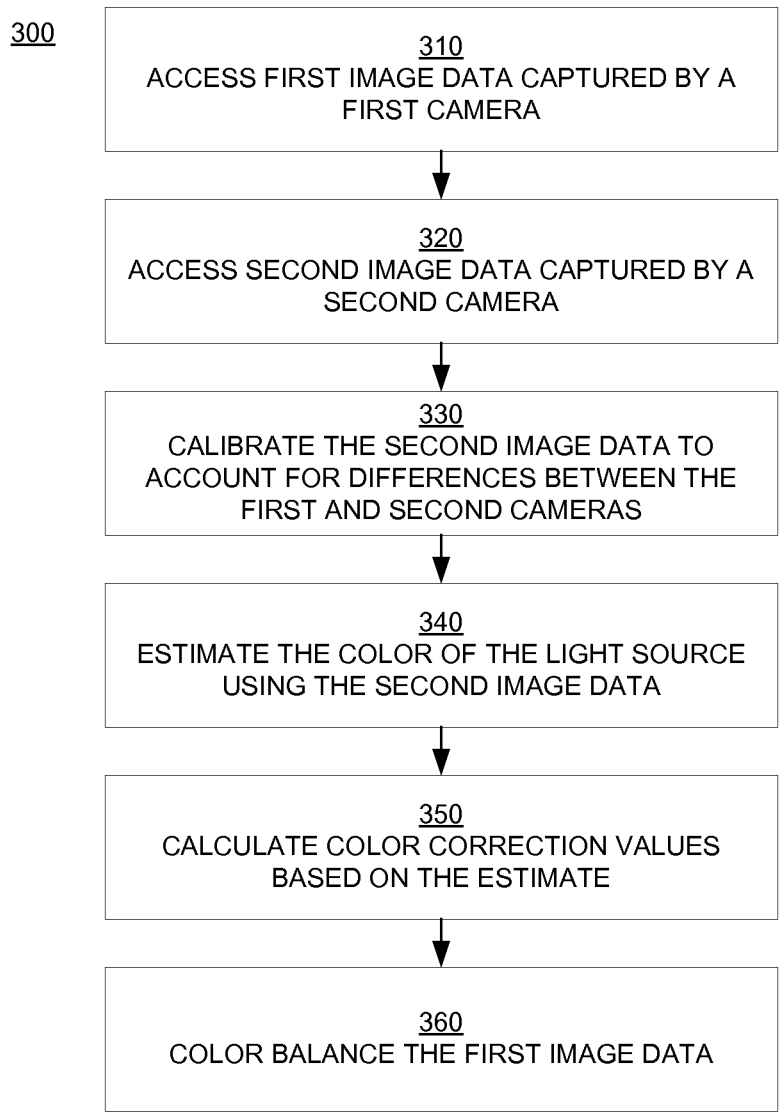
FIG. 3 is a flowchart of an example of a computer-implemented method for processing image data according to an embodiment of the invention.
Figure 4:
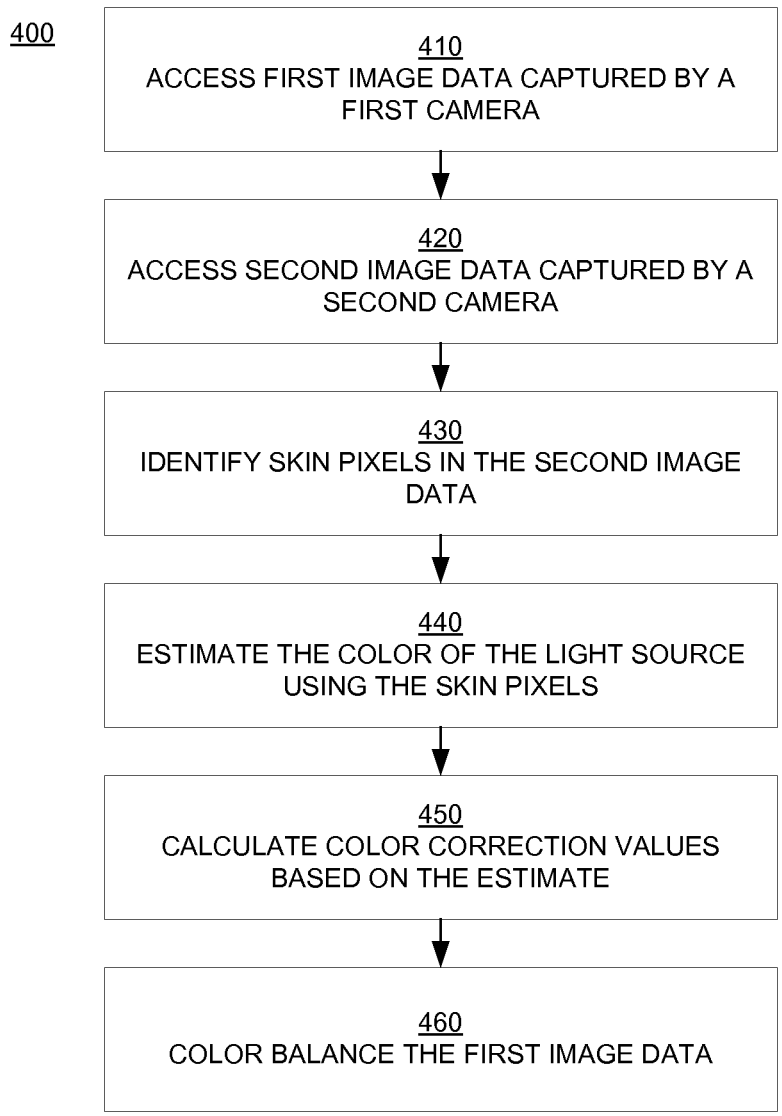
FIG. 4 is a flowchart of an example of a computer-implemented method for processing image data according to another embodiment of the invention.

Embodiments of the invention, such as those described by the flowcharts of FIGS. 3 and 4, can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram of an example of a system 100 upon which embodiments according to the invention can be implemented. In the example of FIG. 1, the system includes a processor 110 that controls execution of the hardware, software and/or firmware necessary for implementing the image data processing methodologies described herein, and a memory 120 that stores image data before, during and after processing of that data. The system can include other components such as a display that can be used to display images captured and represented by the image data, and to display menus and commands as part of a user interface.

The system of FIG. 1 also includes a first camera 130 and a second camera 140, which may be also known as detectors or image capture devices. The first and second cameras may be charged coupled device (CCD) imagers or complementary metal-oxide semiconductor (CMOS) imagers, and can include lenses and other subcomponents. The cameras do not have to use the same type of imager, and may or may not be the same in any other respect (e.g., they may have different resolutions or use different color filters). The cameras can be used to capture still pictures or videos (which are essentially sequences of still images).

Although two cameras are shown in FIG. 1, the present invention is not so limited; there may be any number of cameras. In one embodiment, the cameras are incorporated into a single appliance or device. That is, both cameras may be incorporated within a single housing, and both may utilize the same set of components except for the particular components that constitute each camera.

However, the cameras may instead be implemented in separate devices. If implemented in separate devices, the image data captured and stored by those devices can be transferred to one of the devices or to a different device in order to accomplish the image data processing methodologies described herein. For example, image data can be transferred from one device to another via a wired or wireless connection or using a portable memory device (e.g., a universal serial bus (USB) flash drive). Accordingly, image data processing may be performed in real time (as the data is acquired) or at a later time (post-processing).

A system implementing the present invention can be incorporated into different types of devices or appliances that may include components or functionality other than that described above. In one embodiment, the system of FIG. 1 is implemented in a cell phone.

Figure 2:
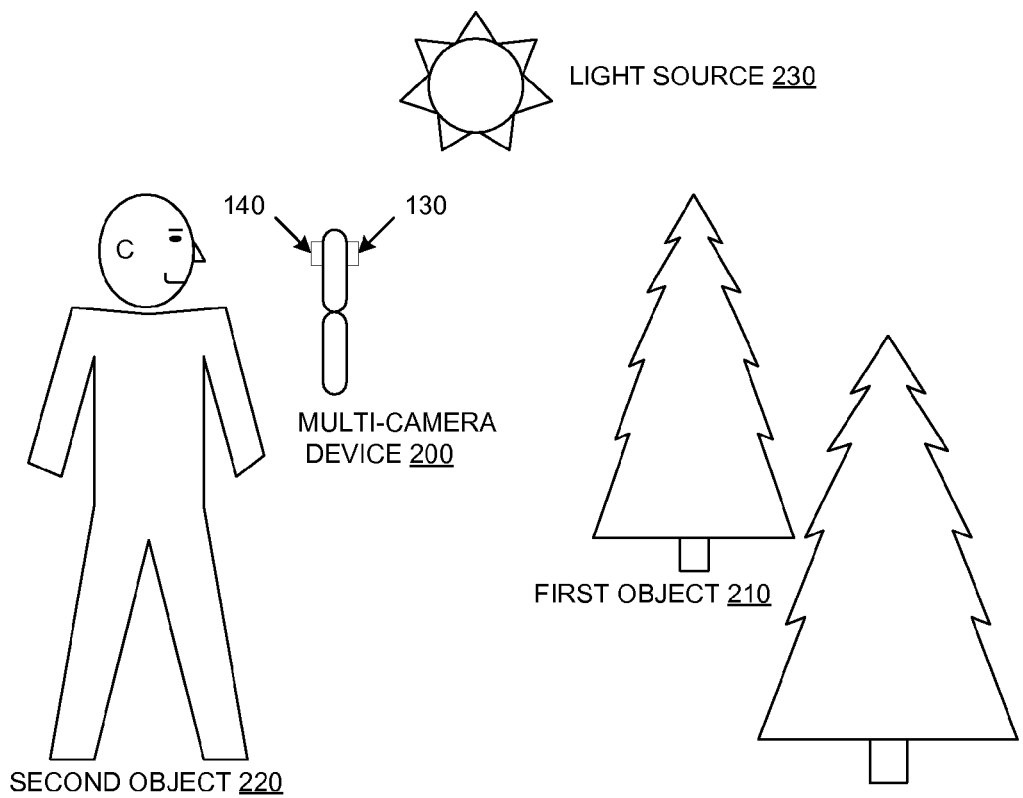
FIG. 2 illustrates the use of an example device according to an embodiment of the invention.

FIG. 2 illustrates the use of a multi-camera device 200 (e.g., a cell phone) according to an embodiment of the invention. In this example, both the first and second cameras are in the same location and are thus subject to essentially the same ambient conditions. That is, each of the cameras is subject to the same light source 230 (e.g., sunlight, artificial lighting, etc.).

The first camera 130 is used to take a first picture (e.g., of the first object 210). At or about the same time, the second camera 140 is used to take a second picture (e.g., of the second object 220). Significantly, the first and second cameras are pointed in different directions. Thus, the first camera acquires a first set of image data, and the second camera concurrently acquires a second (different) set of image data.

In one implementation, the second camera takes a picture of the photographer each time the first camera takes a picture. As such, the second object presents a known surface to the second camera. In other words, the same person will typically use the device 200, and therefore features associated with that person (e.g., his or her face) will appear in each picture captured by the second camera. Alternatively, the photographer can intentionally wear the same thing (e.g., an item of clothing, a badge, etc.) each time pictures are taken so that, at least in one respect, the pictures taken by the second camera will be similar to one other. In general, the image data captured by the second camera may include a feature that is relatively constant across multiple pictures/image frames and, using the inventive methodologies described herein, can be used to facilitate processing of the image data captured by the first camera.

However, embodiments described herein are not limited to a single user per device and, as will be seen, can be readily adapted to scenarios in which different photographers use the same device or in which the second camera captures images of objects other than a person's face.

According to embodiments of the present invention, pictures are taken with multiple cameras, and the statistics associated with those pictures are used, for example, for color balancing. In overview, first image data captured by a first camera can be accessed (e.g., retrieved from memory). Similarly, second image data captured by a second camera can be accessed. The first image data is then processed (e.g., color balanced) using information that is derived from the second image data. The second image data may be used by itself or in combination with the first image data.

FIG. 3 is a flowchart 300 of an example of a computer-implemented method for color balancing image data according to an embodiment of the invention. Although specific steps are disclosed in the flowchart, such steps are exemplary. That is, embodiments of the present invention are well-suited to performing various other steps or variations of the steps recited in the flowchart. Also, the example of FIG. 3 presumes the use of two cameras, but can be readily extended to cases in which more than two cameras are used.

In block 310, first image data captured by a first camera is accessed. More specifically, with reference also to FIG. 1, first (unprocessed or raw) image data, corresponding to a first picture or a first image frame, is captured by the first camera 130, which is facing in one direction—away from the photographer and toward a scene to be imaged.

In block 320, second image data captured by a second camera is accessed. More specifically, second (raw) image data, corresponding to a second picture or second image frame, is captured by the second camera 140, which is facing in a direction different from that of the first camera—perhaps toward another part of the scene, or perhaps toward the photographer.

In one embodiment, the first and second image data are captured at or about the same time. As mentioned herein, the second image data can be used to estimate the color of a light source, and that estimate can in turn be used to color balance the first image data. Alternatively, if the light source is assumed to be similar to a Plankian black-body radiator, then the temperature of that radiator (known as the Correlated Color Temperature or CCT) can be estimated. For these purposes, the first and second image data should be acquired close enough in time so that each camera is subject to the same color and intensity of light source.

In block 330, in one embodiment, the second image data is calibrated to account for differences between the second camera and the first camera. For example, the second image data may be adjusted so that, if the first and second cameras were to take a picture of the same surface, both cameras would provide the same output color value for that surface. Calibration techniques are known in the art. In one embodiment, a color calibration matrix is applied to the second image data to adjust pixel values.

In blocks 340 and 350, information derived from the image data associated with the second camera is used to identify the color of the light source and to correct or adjust image data captured by the first camera. Generally speaking, if two or more cameras are used, information derived from the image data associated with any of those cameras can be used to correct/adjust any of the image data associated with any of the other cameras.

More specifically, in block 340, the color of the light source (illuminant) is estimated. In one embodiment, both the first and second sets of image data (from the first and second cameras, respectively) can be used to estimate the color of the light source to set the color balance. In one such embodiment, the first and second sets of image data are treated as a single set of image data, and a statistics-based color balance scheme is then applied to the single set. This is not to say that the two sets of image data are combined to form a composite image. Rather, some statistics-based color balance techniques work better when there is more variety in the imaged scene, which is more likely to occur by combining the image data from two cameras pointing in different directions as shown in the example of FIG. 2. Thus, the use of multiple sets of image data in the manner just described can increase the accuracy of statistics-based techniques.

In another embodiment, only the second set of image data (from the second camera 140 of FIG. 2) is used to estimate the color of the light source. One such embodiment is described further in conjunction with FIG. 4, below.

Continuing with reference to FIG. 3, in block 350, once the color of a light source is estimated, then any of a variety of known techniques can be used to calculate color correction values or functions based on that estimate.

In block 360, the color correction values/functions that are derived as just described are applied to color balance the first image data in a conventional manner.

In one embodiment, as mentioned above, the second camera is pointed toward the photographer, and a picture of the photographer is taken at or about the same time the first camera takes a picture. The photographer's skin tone, for example, could then be used as a reference point to identify the color of the light source for color balancing. In this respect, the photographer's face is analogous to a gray card; however, compared to the use of a gray card, the photographer need not carry or set up extra equipment or spend extra time taking a picture.

FIG. 4 is a flowchart 400 of an example of a computer-implemented method for processing image data using a skin tone-based approach according to another embodiment of the invention. Although specific steps are disclosed in the flowchart, such steps are exemplary. That is, embodiments of the present invention are well-suited to performing various other steps or variations of the steps recited in the flowchart.

In block 410, first image data captured by a first camera is accessed. More specifically, with reference also to FIG. 1, first (raw) image data, corresponding to a first picture or a first image frame, is captured by the first camera 130, which is facing away from the photographer, toward a scene to be imaged.

In block 420, second image data captured by a second camera is accessed. More specifically, second (raw) image data, corresponding to a second picture or second image frame, is captured by the second camera 140, which is facing toward the photographer.

In one embodiment, as previously discussed herein, the first and second image data are captured at or about the same time. Also, as previously discussed herein, the second image data may be calibrated to account for differences between the second camera and the first camera.

In block 430 of FIG. 4, "skin pixels" (pixels that have a skin-toned color value) in the second image data are identified. There are many known techniques that can be used to determine which pixels are skin pixels. For example, the photographer's face can be detected and the nose region clipped. Pixels within a certain area or distance from the center of the captured image can be used. Pixels that are close to skin color can be identified and used. A combination of these types of constraints can be used so that only pixels that are in a certain area of the image and that are in the color range of skin will be used.

In block 440, the color of the light source is estimated. In one embodiment, once the skin pixels are identified, the color of the light source is estimated by comparing the color of those pixels to a database that contains, for example, the different colors exhibited by skin when it is exposed to different colors of light. This database can be constructed by calibrating the multi-camera device for a specific user. For example, a user can take pictures under different lighting conditions in order to train the device to recognize the color of the light source based on the user's skin tone. There may be multiple databases (e.g., one or more database per user), each constructed as just described.

Alternatively, each database can be constructed dynamically. Each time a picture is taken, the color of the light source is estimated using a conventional technique. The color of the photographer's skin is also recorded. The database can be statistically reduced, such as with the median, so that each color of light source has an associated median skin color.

Both a conventional approach and a skin tone-based approach can be implemented in parallel to determine the color of the light source. If the conventional approach is in poor agreement with the skin tone-based approach, then the latter approach can be used. If there is low confidence in a conventional approach because, for example, the image scene contains a relatively small range of colors, then the skin tone-based approach can be used. If there is high confidence that the conventional approach estimated the color of the light source correctly, and the skin tone-based approach is in poor agreement with this estimate, then this can indicate that there has been a change, for example, in the photographer's complexion or a different photographer is using the device, which in turn may indicate that the database ought to be reconstructed or a different database ought to be selected.

In another approach, sometimes referred to as color by correlation, a probability matrix is statically or dynamically developed. The correlation between sets of scene colors and illuminant colors is calculated. Given a new set of scene colors, the maximum probability light source color is used as the estimated color. Using a multi-camera device as described herein, a combination of scene colors and the photographer's skin tone can be used to develop a probability table that correlates light source color to imaged colors. Such a probability table can be generated once or dynamically adapted as described above.

In each of the approaches just described, if skin pixels cannot be identified, then other color balance techniques can still be used to identify the color of the light source.

Furthermore, other attributes of the image data captured by the second camera can be used in place of skin tone. As mentioned above, the photographer can wear the same item of clothing (e.g., a white hat or shirt) or may pin the same badge (e.g., a white patch) to their clothing in order to provide a reference that can be used in place of skin tone for color balancing.

In block 450 of FIG. 4, once the color of a light source is estimated, then any of a variety of known techniques can be used to calculate color correction values or functions.

In block 460, the color correction values/functions that are derived as just described are applied to color balance the first image data in a conventional manner.

Embodiments according to the invention are not limited to color balancing. Referring again to FIG. 2, in one embodiment, the second image data (from the second camera) is used to implement image stabilization in the first camera. If the first and second sets of image data indicate both cameras are moving in the same direction, then the multi-camera device is being moved laterally in that direction. If the cameras are moving in opposite directions—one to the left and one to the right—then the multi-camera device is moving rotationally around a vertical axis (yaw). If the cameras are moving in opposite directions—one up and one down—then the multi-camera device is moving around a horizontal axis (pitch). In any of these scenarios, information about the relative movement of the cameras can be used to implement image stabilization in the first camera.

In another embodiment, the second image data (from the second camera) can be used to adjust a setting of the first camera. For example, as described above, the second camera can be pointed at a known surface, such as the photographer's face. Instead of or in addition to estimating the color of the light source, the brightness or intensity of the light source can also be estimated using a similar approach, and the first camera's exposure setting can be adjusted accordingly.

In security applications, for example, the first camera may be pointed at a room to be monitored while the second camera is constantly pointed at a known surface, such as a wall of uniform color. Accordingly, a maximum color value for the pixels in the second image data (from the second camera) can be established. If, for example, the lights in a dark room are turned on, then the pixel values in the second image data would be expected to exceed the maximum value. In response, the gain of the first camera can be automatically adjusted so that it can continue to monitor the room.

In yet another embodiment, metadata associated with the second image data can be used to categorize the first image data. For example, the image of the photographer (captured by the second camera) can be saved with each picture taken by that photographer with the first camera. Thus, each picture can be categorized and subsequently sorted by the user who took it.

Similarly, the photographer's facial expression can be determined and used as metadata to organize pictures. For example, pictures that made the photographer smile could be categorized and sorted using that information. In general, any information included in the second image data can be used to categorize and sort the first image data.

The metadata provided by the second image data (from the second camera) can be used to perform multi-level sorts. That is, one type of metadata can be used to select a first subset of images, and another type of metadata can be used to select a subset of the first subset.

Furthermore, the photographer's complexion and/or clothing, for example, might help determine whether the multi-camera device is being used indoors or outdoors. In addition to being useful metadata, this type of information could help with color correction and the settings for the first camera. For instance, if the photographer always wore the same hat when he/she was outside, the color of the hat in the second (backward-facing) camera would be highly correlated with the first (forward-facing) camera seeing a scene under natural light; that is, if the photographer is wearing this particular hat, then the picture is likely being taken under natural light. This type of statistical correlation could be learned on the fly.

The photographers gaze angle could help with camera settings such as auto-focus and exposure. For example, if the first camera is pointed at a scene containing both light and shadows, and the second image data (from the second camera) indicates that the photographer is looking at a shadowed area, then the settings for the first camera can be set for shadows. In addition to providing assistance while pictures are being taken, the photographer's gaze angle can be useful for post-processing the first image data (from the first camera).

The foregoing descriptions of specific embodiments of the present invention have been presented for purposes of illustration and description. They are not intended to be exhaustive or to limit the invention to the precise forms disclosed, and many modifications and variations are possible in light of the above teachings. Although the examples above described how one camera can be used in combination with a second camera, the present invention is not so limited. In general, any group or array of cameras (implemented as separate devices or as any number of multiple camera devices) can be used together. Information gathered by each camera can be pooled, and that pool of information can be applied to each camera in the array. For example, based on the information pool, the color of the light source can be determined and used to establish settings for each camera in the array (and even to a camera that did not contribute to the information pool but is in the vicinity of the array of cameras)—each camera will have the same settings. Those settings should be better, in general, then the settings obtained individually by each camera.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-readable storage medium having computer-executable instructions for performing a method of processing image data, the method comprising:
   accessing first image data captured by a first camera, the first image data acquired with an ambient light source;
   accessing second image data captured by a second camera, the second image data acquired with the ambient light source and comprising a selected color value; and
   processing the first image data using information that is derived using the second image data, the processing comprising:
   determining a color for the first ambient light source using the second image data by comparing the selected color value to information in a database, the information indicating colors exhibited by the selected color value under different colors of light;
   updating the database to include the result of the determining operation;
   generating correction factors using the color; and
   applying the correction factors to the first image data to generate third image data.

2. The computer-readable storage medium of claim 1 wherein the method further comprises calibrating the second image data to compensate for differences between the second camera and the first camera.

3. The computer-readable storage medium of claim 1 wherein the second image data comprises an object having a color associated therewith, wherein the processing further comprises:
   identifying, in the second image data, pixels that correspond to the object; and
   applying the correction factors to color balance the first image data.

4. The computer-readable storage medium of claim 1 wherein the method further comprises using the second image data to adjust a setting of the first camera.

5. The computer-readable storage medium of claim 1 wherein the method further comprises using metadata associated with the second image data to categorize the first image data.

6. The computer-readable storage medium of claim 1 wherein the method further comprises capturing the first image data and the second image data concurrently with the first camera and the second camera together.

7. The computer-readable storage medium of claim 1 wherein the method further comprises implementing image stabilization in the first camera using the first and second image data to determine movement of the first camera relative to movement of the second camera.

8. A system for processing image-based data, the system comprising:
   a processor;
   a memory coupled to the processor;
   a first camera coupled to the processor;
   a second camera coupled to the processor, wherein information derived from second image data captured by the second camera and stored in said memory is accessed and used by said processor to process first image data captured by the first camera, the first and second image data acquired with an ambient light source in common and the second image data comprising a selected color value, wherein the first image data is processed to determine a color for the first ambient light source using the second image data by comparing the selected color value to information in a database, the information indicating colors exhibited by the selected color value under different colors of light, the database then updated to include the color determined by the comparing operation, wherein further correction factors are generated using the color and applied to the first image data to generate third image data.

9. The system of claim 8 wherein the second image data is also adjusted to compensate for a difference between the second camera and the first camera.

10. The system of claim 8 wherein the second image data is used to implement image stabilization in the first camera.

11. The system of claim 8 wherein metadata associated with the second image data is used to categorize the first image data.

12. The system of claim 8 wherein the second image data is used to determine a gaze angle of the second camera's user, wherein the gaze angle is used to adjust a setting of the first camera.

13. A computer-implemented method for processing image data, the method comprising:
   accessing first image data captured by a first camera and stored in memory, the first image data comprising a picture taken with a first ambient light source;
   accessing second image data captured by a second camera with the first ambient light source and stored in memory, the second image data comprising a selected color value;
   determining a color for the first ambient light source using the second image data by comparing the selected color value to information in a database, the information indicating colors exhibited by the selected color value under different colors of light;
   updating the database to include the result of the determining operation;
   generating correction factors using the color; and
   applying the correction factors to the first image data to generate third image data, wherein the third image data comprises a modified version of the picture.

14. The method of claim 13 further comprising using the second image data to implement image stabilization in the first camera.

15. The method of claim 13 further comprising adjusting a setting of the first camera based on the second image data.

16. The method of claim 13 further comprising categorizing the first image data using metadata derived from the second image data.

* * * * *